United States Patent [19]

Bachle

[11] 4,169,967

[45] Oct. 2, 1979

[54] FITTING FOR LIQUID TIGHT FLEXIBLE METAL CONDUIT

[75] Inventor: Walter W. Bachle, Harwinton, Conn.

[73] Assignee: General Signal Corporation, Stamford, Conn.

[21] Appl. No.: 863,500

[22] Filed: Dec. 22, 1977

[51] Int. Cl.² .............................................. H02G 3/06
[52] U.S. Cl. .................... 174/65 SS; 285/12; 285/23; 285/161; 285/322; 285/343
[58] Field of Search ............... 285/248, 249, 250, 342, 285/341, 343, 12, 23, 161, 322, 323; 174/65 R, 65 SS, 78, 68; 277/9, 11

[56] References Cited

U.S. PATENT DOCUMENTS

| | | | |
|---|---|---|---|
| 1,132,086 | 3/1915 | Goodall | 277/225 X |
| 1,436,774 | 11/1922 | Mummert | 277/220 |
| 2,467,520 | 4/1949 | Brubaker | 285/249 |
| 2,541,200 | 2/1951 | Brubaker | 285/249 |
| 3,142,500 | 7/1964 | Wesseler | 285/323 X |
| 3,201,153 | 8/1965 | Currie | 285/249 |
| 3,227,803 | 1/1966 | Gohs | 174/78 |
| 3,239,252 | 3/1966 | Schmitt et al. | 285/250 |
| 3,393,267 | 7/1968 | Busse | 174/78 |
| 3,424,853 | 1/1969 | Johnson | 174/78 |
| 3,492,410 | 1/1970 | Kelly | 174/78 |
| 3,603,912 | 9/1971 | Kelly | 285/249 X |
| 3,647,934 | 3/1972 | Hurtt | 285/248 X |
| 3,649,050 | 3/1972 | Woodling | 285/341 X |
| 3,964,772 | 6/1976 | Cox | 285/161 |
| 3,986,731 | 10/1976 | DeHoff | 285/249 X |
| 4,019,762 | 4/1977 | Eidelberg et al. | 285/341 |

Primary Examiner—Dave W. Arola
Attorney, Agent, or Firm—Milton E. Kleinman; George W. Killian; Harold S. Wynn

[57] ABSTRACT

A liquid tight fitting for liquid tight flexible metal conduit which provides higher unit sealing pressures and improved liquid tight sealing by providing line, rather than surface, contact at critical points. The body member of the fitting makes line contact with a flared lip of the ferrule. The lip of the ferrule makes line contact with the sealing ring. The vector forces which create the seals have components in the directions required to most effectively and efficiently produce the seals. The sealing ring may be made symmetrical, is discontinuous, has an inside bead for sealing against the conduit and may include wings for retention in the gland nut prior to assembly of the fitting on a conduit end.

27 Claims, 9 Drawing Figures

FITTING FOR LIQUID TIGHT FLEXIBLE METAL CONDUIT

BACKGROUND OF THE INVENTION

The structure disclosed herein relates to conduit fittings and more particularly to liquid tight conduit fittings for connection to liquid tight flexible metal conduit used in power distribution and industrial wiring. The purpose of the fitting and conduit is to protect and isolate the electrical wires running through the conduit and fittings to junction boxes, hubs, and the like. The conduit and fittings are designed to exclude liquid such as oil and water from the wires contained within the conduit.

Conduit and fittings, including flexible metal conduit, liquid tight flexible metal conduit, and associated fittings, are not broadly new in the electrical wiring trade. However, the various prior art devices have suffered from one or more defects, deficiencies, and inconveniences. Some devices have failed to provide a sufficiently water tight seal and/or the seal deteriorates with age and allows the passage of liquid. Some devices allow small openings through which liquids may pass by capillary action. Some structures include numerous components which must be assembled with precisely the right orientation to secure the desired seal. Some devices are constructed of numerous parts and the careless or inadvertent ommission of one of the parts may result in failure. Some prior art fittings are so large and bulky that they will not fit in confined spaces. Some prior art fittings fail to provide an adequate ground path from the inner metallic core of the conduit to the box, hub or junction box to which the body of the fitting is secured. Another problem is that some prior art fittings cannot be opened for inspection, changes, or modification without destruction and replacement of the fitting, or selected parts. Other difficulties and deficiencies, with which artisans skilled in the trade are familiar, exist with respect to selected devices.

The invention used herein may incorporate the features disclosed in one or more of the following: U.S. Pat. No. 4,000,918 issued Jan. 4, 1977, to F. A. Reker; application Ser. No. 677,460, filed Apr. 15, 1976 by R. E. Lundeberg and issued May 16, 1978 as U.S. Pat. No. 4,090,029; and application Ser. No. 809,139 filed June 22, 1977 by W. W. Bachle and issued May 9, 1978 as U.S. Pat. No. 4,088,327, and all of which are assigned to the same assignee as the present invention.

SUMMARY OF THE INVENTION

A fitting to be assembled on the end of a liquid tight flexible metal conduit and which is itself liquid tight is provided. To assemble the fitting, a gland nut having internal threads, a shoulder and a throat portion is slid over the conduit end. A discontinuous sealing ring which has ends, a bottom surface, a top surface, and an inner bead surface is preferrably preassembled inside the gland nut and, therefore, placed over the conduit end at the same time the gland nut is so placed. Next, a ferrule having an outer cylindrical wall which encases the end of the conduit is assembled to the conduit end. The end of the ferrule facing the gland nut is flared, and the flared end contacts the bottom surface of the sealing ring and makes a sealing contact therewith. Next, a body member which has threads which mate with those of the gland nut is assembled over the ferrule. The body member includes an edge which makes sealing contact with the flared surface of the ferrule. The top surface of the sealing ring makes contact with the shoulder of the gland nut when the threads of the body member and gland nut are engaged. The inner bead surface of the sealing ring makes sealing contact with the conduit when the threads are engaged. The forces which are applied to the various surfaces of the sealing ring as the body member and gland nut are tightened together include components which urge the ends of the sealing ring into sealing contact.

In order to facilitate assembly and guard against possible assembly errors, the sealing ring is made symmetrical so that it is impossible to assemble it upside down. In addition, since the sealing ring could be inadvertently or carelessly omitted from the assembly, it is fabricated in such a manner that it may be inserted into the gland nut and retained therein so that as the gland nut is assembled on the conduit, the sealing ring is automatically included. To this end, the sealing ring is made of an elastomeric material which is discontinuous and which, in its relaxed state, will assume an outer circumference with is somewhat larger than the inner circumference of the gland nut. Therefore, when the sealing ring is inserted in the gland nut, it will be held therein by the forces which make it seek a larger diameter.

The sealing contacts are designed to constitute line contact to increase the unit pressure and improve the quality of the seal. Components are designed so as to cause the vector forces which create the seals to have components oriented to provide appropriate forces of appropriate magnitudes in appropriate directions.

It is an object of the present invention to provide a new and improved conduit fitting.

It is a more specific object of the invention to provide a new and improved electrical fitting for making a liquid tight connection with liquid tight metal flexible conduit.

It is a more specific object of the invention to provide a fitting of the class described which provides more effective and efficient liquid tight seals.

It is a more specific object of the invention to provide forces for producing the various liquid tight seals which are in proportion to the forces required to produce the seal.

It is another object of the invention to provide a seal which has high unit forces on a line contact.

It is another object of the invention to provide a fitting of the class described which may be opened and reclosed if required.

It is another object of the invention to provide good electrical conductivity between the interior metal of the conduit and the metal of the fitting.

BRIEF DESCRIPTION OF THE DRAWING

In the various figures of the drawing, like elements are given like identifying numbers in all figures.

DESCRIPTION OF THE PREFERRED EMBODIMENT

Figure 1:
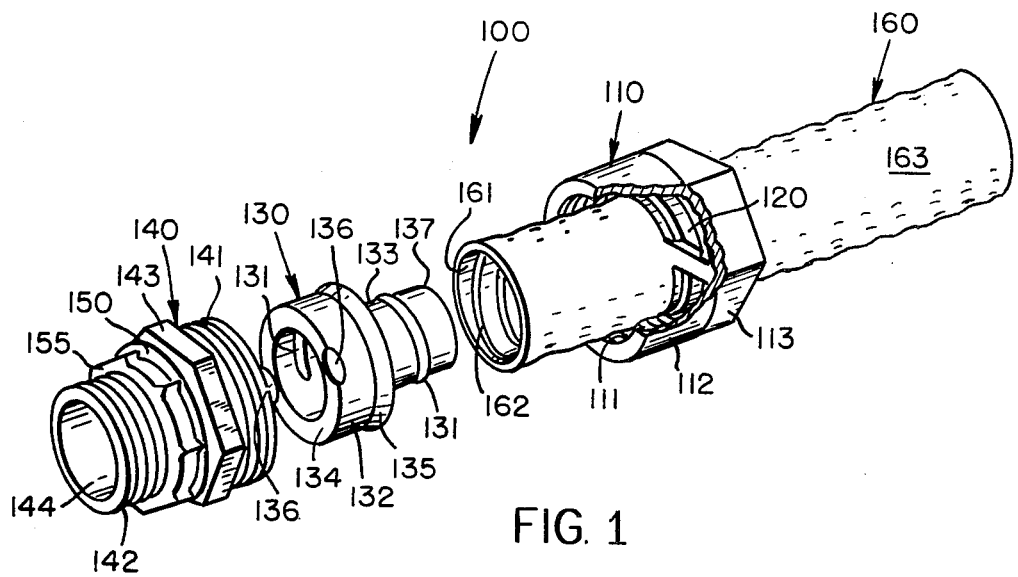
FIG. 1 comprises an exploded view of the fitting arranged for assembly and with one part, including a cut away portion, to show a member retained therein.

The organization and function of the various components of the liquid tight fitting may best be understood from the following description when considered together with the drawing in which the fitting is indicated generally as 100. From examination of FIG. 1, it will be seen that the fitting 100 comprises: a gland nut 110 having captured therein a sealing ring 120; a ferrule 130; and a body member 140 having an associated sealing member 150 and locknut 155.

The fitting 100 is designed for assembly on a liquid tight flexible metal conduit 160 which may be of a conventional type having a metallic core 161 comprising an elongated strip of metal wound spirally and interlockingly in overlapping convolutions that define an internal spiral groove 162. The metallic core 161 is covered by a suitable resilient yieldable material 163 which may comprise a plastic or a suitable equivalent. The flexible metal conduit 160 thus comprises a hollow conduit through which electrical conductors may be drawn. The metal conduit 160 serves to protect the electrical conductors (not shown) from mechanical abuse and from moisture, all in a manner which is conventional and well understood by those familiar with the use of liquid tight flexible metal conduit 160.

As may be seen in FIGS. 1 through 4, the gland nut 110 includes internal threads 111 in a lower portion 112 of the gland nut 110. The gland nut 110 also includes an upper collar portion 113 which may include flats for convenient wrenching. As may be more clearly seen in FIG. 2, the interior of the collar 113 is tapered so that the portion remote from the threads 111 is further from the sheath 163 than the lower end of the collar closer to the threads 111. The function of the tapered surface 114 will be explained more fully hereinbelow. The collar 113 includes a throat 115 which will serve a function to be described more fully hereinbelow. However, it should be observed that the diameter of the throat 115 is smaller than the diameter of the threads 111. If desired, the lower portion 112 of the gland nut 110 could include flat surfaces for wrenching. However, by providing wrenching flats on the collar 113, it is possible to provide a less bulky gland nut and one which can be assembled in tighter quarters and which requires a smaller turning radius.

Considering now more specifically the body member 140, it will be seen to include an upper end with external threads 141 and a lower end with external threads 142 and an intermediate wrenching area 143. The body member 140 includes a through passage 144 having a minimum internal diameter approximately equal to that of the conduit 160. The body member 140 includes a shoulder 145, best seen in FIG. 3, and which provides for an enlargement of the through passage 144 in the upper section of the body member 140.

Considering now more specifically the ferrule 130, it will be seen to be made of metal and to include a thread 131 which will mate with the internal groove 162 of the conduit 160. As may best be seen in FIG. 1, the ferrule 130 comprises a shorter outer cylindrical member 132 and a longer inner cylindrical member 133 which are joined together by a lower surface 134. The outer cylindrical member 132, at its upper end, includes a flared portion 135 which will serve a function to be described more fully hereinafter. The ferrule 130 also includes holes 136 which may pierce one or more of the outer cylindrical member 132, the inner cylindrical member 133, and the lower surface 134. The holes 136 provide a simple and convenient means for checking for proper and complete assembly, all in the manner more fully described in the U.S. Pat. No. 4,000,918, issued to Reker on Jan. 4, 1977 and assigned to the same assignee as the present invention.

The sealing ring 120 may be seen more completely in FIGS. 5, 5A, 5B, and 5C. The sealing ring 120 may be made of any convenient resilient material in the thermoplastic family. The sealing ring 120 may be most conveniently and economically fabricated by a molding process, although, naturally, other procedures might be used and might be expedient in certain circumstances. As may be clearly seen in FIGS. 5 and 5A, the sealing ring 120 is not an endless ring and includes ends 121 and 122. The ends 121 and 122 constitute faces which are proportioned for a mating relationship when the sealing ring 120 is closed. The faces of the ends 121 and 122 may be at an angle of approximately 45° to an imaginary horizontal plane bisecting FIG. 5. However, other angles may be used, although both excessively large and excessively small angles may introduce problems. The sealing ring ring 120 will be seen to comprise a body portion 123, an upper flange portion 124, a lower flange portion 125, an interior raised beading 126, and retaining wings 127. As may best be seen in FIG. 5, the ends 121 and 122 may not be planer and may include small vertical sections 128 and/or 128' in the flange sections 124 and 125.

The wings 127 serve a function more fully described in the Bachle application Ser. No. 809,139, filed June 22, 1977 and assigned to the same assignee as the present invention. That is, they engage the threads 111 to help retain the ring 120 inside the gland nut 110 prior to assembly of the combination on the conduit 160.

The fitting described herein may be used for making a liquid tight connection to flexible metal conduit which ranges in size from under ½ inch to at least 6 inches in diameter. Obviously, different parts are used for each fitting size, but they all have the general characteristics illustrated in the accompanying figures.

Fittings for coupling to the cut off end of a liquid tight flexible metal conduit are not broadly new. However, prior art devices have not always provided the desired liquid tight protection, in part, because of careless workmanship or assembly. For example, failure to fully insert the ferrule 130 into the conduit 160 could result in a poor electrical ground path and an insecure and weak assembly wherein the conduit 160, if subjected to too much axial force, could be pulled from the fitting 100. To guard against this, the teachings of the aforementioned U.S. Pat. No. 4,000,918 may preferably be incorporated in the ferrule 130. More specifically, the holes 136 provide for convenient visual inspection after assembly.

Another difficulty with prior art devices resided in the assembly of the sealing ring. In some prior art devices, the sealing ring comprised an endless ring which had an internal diameter very nearly equal to the outside diameter of the conduit. Sometimes endless sealing rings were difficult to get onto the conduit and, therefore, were omitted from the assembly. To overcome this difficulty, split sealing rings were devised. However, because of the number of parts involved it was not unusual for a workman to fail to include the sealing ring in the assembly, thereby producing a fitting which did not have the desired liquid tight characteristics. To minimize the possibility of inadvertently omitting the sealing ring 120, the present fitting makes use of the feature disclosed in the aforementioned 809,139 application. More specifically, the ring 120 includes wings 127 to reduce the number of separate parts to be assembled by retaining the ring 120 within the gland nut 110 prior to assembly of the fitting 100 to the conduit 160.

Figure 2:
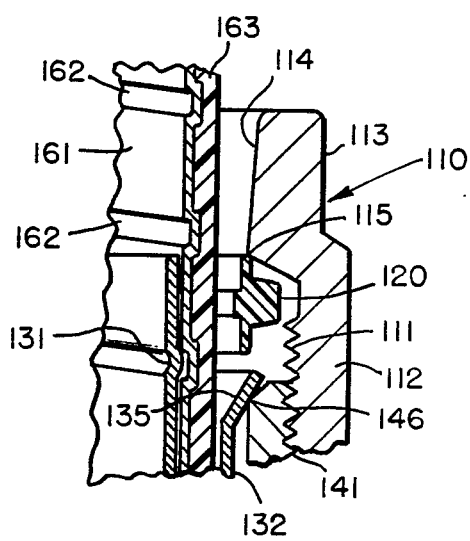
FIG. 2 is an enlarged cross sectioned view of a portion of the fitting assembled on the flexible conduit prior to final tightening of the elements.
Figure 3:
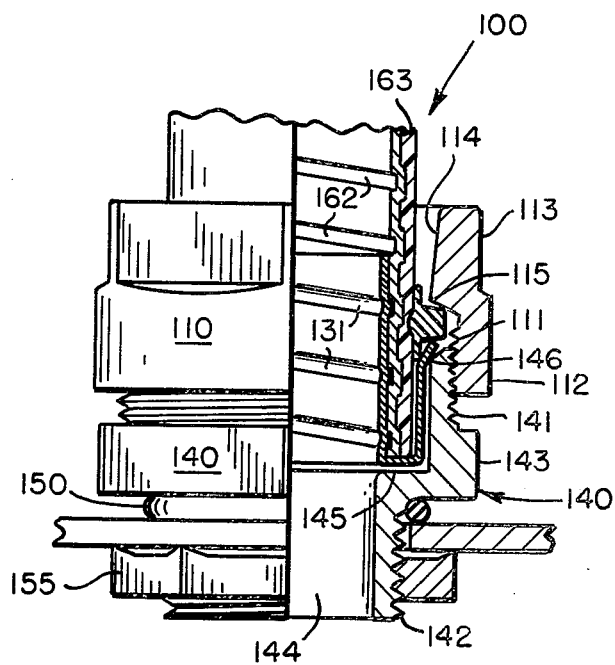
FIG. 3 comprises a view of the fitting on a flexible conduit member and with some portions cross sectioned to illustrate the relationship of the members when the seal is complete.
Figure 5:
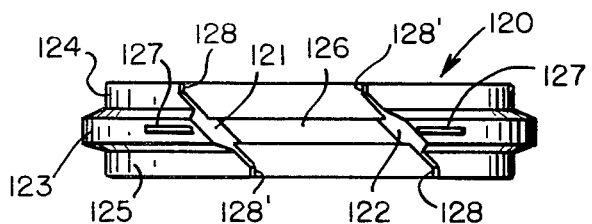
FIGS. 5, 5A, 5B, and 5C comprise various views and cross sections of the sealing ring.
Figure 5B:
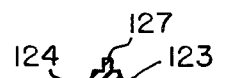
Figure 5C:
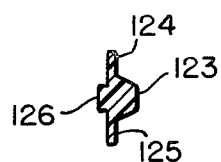
Figure 5A:
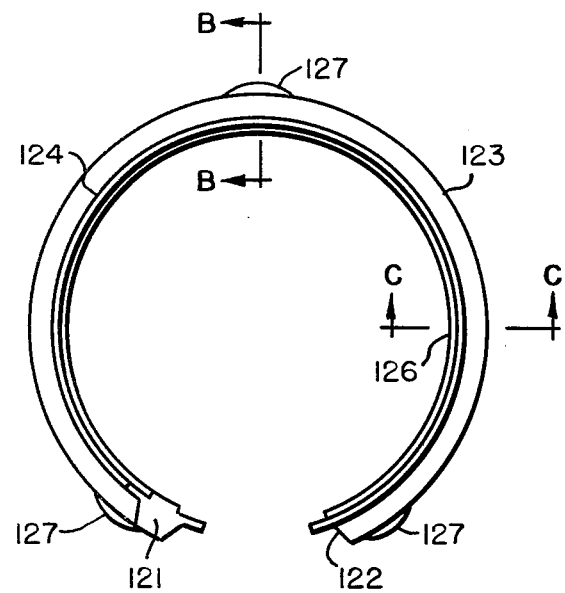

In accordance with the teachings of the aforementioned Bachle application, the sealing ring 120 of the present application is assembled and retained within the gland nut 110 so that the gland nut 110 and sealing ring 120 are assembled onto the conduit 160 as a subassembly. Because the sealing ring 120 is split, and in its relaxed state, it has an outside diameter which is greater than the inside diameter of the gland nut and because the sealing ring 120 includes the wings 127, it will be conveniently and securely retained within the gland nut. With the sealing ring 120 thus assembled in the gland nut 110, the interior diameter of the sealing ring 120 is still somewhat larger than the outside diameter of the conduit 160 and, therefore, the subassembly of the gland nut 110 and the sealing ring 120 may be easily and quickly slipped over the end of the conduit 160 as illustrated more clearly in FIGS. 1 and 2. After the gland nut 110 and associated sealing ring 120 have been placed on the conduit 160, the ferrule 130 is screwed into the conduit 160 until it cannot be turned any further and a portion of the conduit 160 may be seen through the holes 136 of the ferrule 130. When the body member 140 and the ferrule 130 are assembled in enclosing relationship with the outer cylinder member 132 within the body member 140, the lower surface 134 clears the shoulder 145. The flared lip 135 of the ferrule comes in contact with edge 146 of the body member 140, and the lower surface 134 of the ferrule 130 does not touch the shoulder 145 of the body member 140. The edge 146 of the body member 140 comprises a chamfered edge so that the body member 140 and the flange 135 make circular line contact. Line contact is provided because the chamfer angle is greater than the flared lip of the ferrule with respect to the axis of the fitting. After the body member 140 is assembled over the ferrule 130, the gland nut 110 together with the sealing ring 120, is moved down over the conduit 160 until the threads 111 of the gland nut 110 are engaged with the upper threads 141 of the body member 140. FIG. 2 more clearly illustrates the relationship of the various parts at this stage of assembly. As relative rotation is provided between the gland nut 110 and the body member 140, the parts assume the positions more clearly illustrated in FIG. 4. That is, as already mentioned, the circular line, or edge, 146 makes line contact with the ferrule lip 135. The upper end of the ferrule lip 135 makes line contact with the lower surface of the body portion 123 of the sealing ring 120 and the lower flange 125 of the sealing ring 120 is wedged between the sheath 163 of the conduit 160 and the inner surface of the outer cylinder member 132 of the ferrule 130. The angled shoulder 147 is machined at an angle of approximately 45° with the longitudinal axis of the fitting. The shoulder 116 is reamed to an angle of approximately 60° from the longitudinal axis, and this shoulder 116 contacts the upper corner of the body portion 123 of the seal 120.

Figure 6:
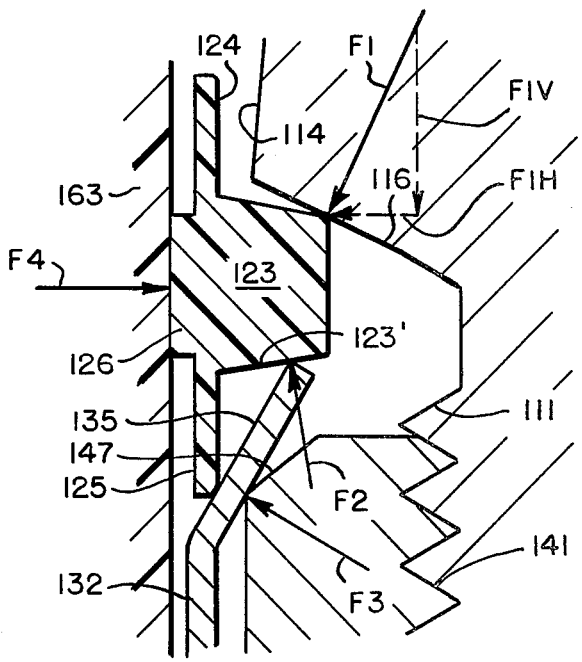
FIG. 6 illustrates the direction of principal vectors which act to produce the liquid tight seals.

It is a paramount object of the invention to prevent any liquid on the outside of the conduit 160 from reaching the interior thereof. It is presumed that the sheath 163 is impervious to liquid and that, therefore, no liquid can enter the conduit 160 through the sheath 163. Examination of FIGS. 2, 3, and 4 will show that effective seals must be made at several points to prevent the entry of liquid. The sealing ring 120 must make a water tight seal with the sheath 163 and it can only do this if the ends 121 and 122 of the sealing ring 120 are brought into a butting and sealing relationship at the same time that the bead 126 of the sealing ring 120 makes a seal with the resilient sheath 163 of the conduit 160. A given contractable split sealing ring 120 with an inner bead 126 is designed to encircle and make a liquid tight seal with liquid tight flexible metal conduit of a given size. As noted, the liquid tight flexible metal conduit has a resilient sheath 163 as an outer covering enclosing a flexible metal core. The outside diameter of a given commercial liquid tight conduit is held within a specific tolerance range so that there is a maximum and minimum outside diameter for each nominal size. The circumferential length of the inner surface of the bead 126 is approximately $\pi$ (Pi equals approximately 3.14159) times the diameter of a conduit having a minimum diameter for its nominal size. The ends 121 and 122 of the sealing ring 120 will be placed in an abutting relationship in response to the forces applied to the sealing ring 120 when the threads 111 of the gland nut 110 and the threads 141 and body member 140 are sufficiently engaged. Further tightening of the gland nut 110 will result in deformation of both the sealing ring 120 and the sheath 163. This will result in the beading 126 pressing into the resilient conduit sheath 163 to form a liquid tight seal. The ends 121 and 122 of the sealing ring 120 are restricted from overlap by the axial forces of the vectors F1 and F2 as illustrated in FIG. 6. When the sealing ring 120 is associated with a conduit 160 having a diameter at the maximum end of its allowable range, and the beading 126 first snuggles against the sheathing 163, the ends 121 and 122 of the sealing ring 120 will have a separation approximately equal to $\pi$ times the difference between the maximum and minimum conduit diameters. Further tightening of the gland nut 110 will result in a radial force which will press the bead 126 into the resilient conduit sheath 163. Since the bead 126 has a small area, large deformation stresses are obtainable to deform the resilient conduit sheath 163 which will result in the sealing ring 120 decreasing in diameter until the ends 121 and 122 of the sealing ring 120 are closed in an abutting relationship. Further tightening of the gland nut 110 will result in the ends 121 and 122 of the sealing ring 120 pressing together in a sealing relationship and further deforming the sealing ring 120. The height of the bead 126 above the adjacent body portion 123 is of the order of at least one half of the difference between the maximum and minimum allowable diameters of the conduit with which the sealing ring 120 is to be associated. Accordingly, the sealing ring 120 will decrease in diameter at least the tolerance range of the conduit after the bead 126 has first snuggled against the conduit sheath 163. Because of the resilient nature of the sheath 163, and the geometry of the bead 126, relatively little force is required to produce the liquid tight seal therebetween.

Another seal that must be obtained is that between the edge 146 of the shoulder 147 of the body member 140 and the flared lip 135 of the ferrule 130. This is a metal-to-metal contact and may require more force to achieve. Since the available force is directed to a line contact rather than to pressing two surfaces together, the unit pressure is greatly increased and the machined edge 146 can dig into the flared lip 135 of the ferrule and produce a good liquid tight seal.

The shoulder 116 of the gland nut 110 bears on the upper surface of the body portion 123 of the sealing ring 120 and the edge of the flared lip 135 of the ferrule 130 bears on the lower surface of the body 123 of the sealing ring. These forces combine to provide additional seals including a seal between the lower flange 125 of the ring 120 and the outer cylinder member 132 of the ferrule 130.

FIG. 6 is an enlarged cross section of the sealing ring 120 together with adjacent portions of the gland nut 120, the ferrule 130, and the body member 140. Some of the forces acting on the sealing ring 120 are shown at the time the gland nut 110 and body member 140 have been rotated enough to engage their respective threads to cause the contacts indicated. One vector force F1 acts at right angles to the plane of the shoulder 116 of the gland nut 110. The shoulder 116 is at an angle of approximately 60° to the axis and, therefore, the force vector F1 has a greater axial component than its radial component. The relative magnitude of the axial and radial components of the vector F1 are illustrated by the dotted lines F1V and F1H, respectively. The point of contact of the lip of the ferrule pressing against the lower body portion 123 of the sealing ring 120 produces another vector F2. The vector F2 is at right angles to the plane 123' which is a few degress, perhaps of the order of 5°. The vector F2 therefore has a small radial component and a relatively large axial component. The contact between the body member 140 and the ferrule lip 135 produces a vector F3 which is at right angles to the angle of the ferrule lip. The ferrule lip may be at an angle of the order of 30° to the axis of the fitting 100. The vector F4 represents the radial force between the sheath 163 and the raised beading 126 of the sealing ring 120.

Figure 4:
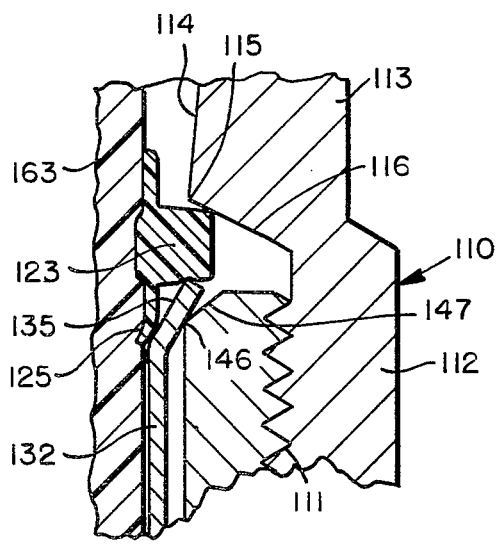
FIG. 4 comprises an enlarged cross sectioned view of a portion of the elements to show more detail of their relationship when the fitting is secured to the conduit.

When it is recalled that the sealing ring 120 is preferably fabricated of plastic material, it will be seen that the radial components of the vector forces F1 and F2 will be adequate to close the sealing ring 120 and cause the raised beading 126 to come in contact with the sheath 163 and, finally, to result in sufficient deformation of the sheath 163 and/or the raised beading 126 to cause the flanges 124 and 125 to come in contact with the resilient sheath 163, all as described hereinbefore and illustrated more clearly in FIG. 4. It should be understood that the length of the vectors F1, F2, F3, and F4 are not intended to indicate their relative magnitude, but to indicate their approximate direction. The shoulder 147 of the body member 140 is machined to assure that the point where vector force F3 acts on the ferrule lip 135 constitutes a circle in a plane. Line contact is assured by the fact that the shoulder 146 is at a greater angle, with respect to the axis of the fitting, than the ferrule lip 135 is. Accordingly, the unit pressure between these two components, resulting from the vector force F3, is very high, thereby resulting in a secure seal.

It is important that the shoulder 116 of the gland nut 110 contacts the body portion 123 of the sealing ring 120 uniformly. The surface 114 is tapered to permit a blend exit of the two-step reamer to compensate for any possible eccentricity in the gland nut.

The principal seals which provide the liquid tight feature are those at the ends 121 and 122 of the sealing ring 120 and those produced by vectors F2, F3, and F4. If these points are liquid tight, it will be seen that there is no way liquid can enter through the fitting to the interior of the conduit 160. There is an auxiliary seal created by the wedging action of the lower flange 125 between the cylinder member 132 and the sheath 163, more clearly seen in FIG. 4. While the seal at the end of vector F1 may prevent the passage of liquid from one side thereof to the other, this seal does not play an important part in preventing moisture from outside the fitting entering the interior of the conduit. The threads 111 and 141 are not required to provide a liquid tight seal.

It will be obvious to those skilled in the appropriate arts that various modifications can be made in the choice of material, dimensions, and angles. For example, a different number of wings 127 could be used on the ring 120; the upper flange 124 could be eliminated and multiple raised beading 126 could be used. However, the flange 124 is preferably used in order to provide a symmetrical ring which cannot be assembled upside down. The angle of the ends 121 and 122 may be changed, but if made too vertical, they will not slide easily to compensate for manufacturing tolerances. If the angle is made too small, the ring 120 would become an impractical spiral.

When the fitting 100 is coupled to the conduit 160, the lock nut 155 may be removed from the threads 142. Then the portion of the body member bearing the threads 142 may be inserted through a hole in a panel or box etc. and the lock nut replaced and tightened. The sealing member 150 will provide a conventional liquid tight seal between the panel and the body member.

In summary, there has been shown and described an electrical fitting for coupling the end of a liquid tight flexible metal conduit to a box, hub or flange etc. and which provides an improved liquid tight seal between the fitting and the conduit wherein the forces for creating the seals are designed to have vector components acting in appropriate directions and magnitudes for producing the required seals. Furthermore, the design provides for improved sealing properties by providing high unit pressures at appropriate sealing points.

While there has been shown and described what is considered at the present to be a preferred embodiment of the invention, modifications thereto will readily occur to those skilled in the related arts. For example, angular relationships could be modified and/or the points of contact between the sealing ring and the ferrule or between the sealing ring and gland nut could be moved. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A fitting for making a liquid tight connection to a liquid tight flexible metal conduit and comprising in combination elements assembled on the conduit in the sequence named:

(a) a gland nut having internal threads, a shoulder and a throat portion;

(b) a discontinuous sealing ring having first and second ends and first, second and third surfaces;

(c) a ferrule having a cylindrical wall encasing the end of a conduit inserted therein and with said cylindrical wall terminating in a flared portion the end of which contacts said first surface of said sealing ring for making a line sealing contact;

(d) a body member including threads mating with those of said gland nut and including a portion contacting said flared portion of said ferrule for making a line sealing contact therewith;

(e) said second surface of said sealing ring making line contact with said shoulder portion of said gland nut in response to the engagement of the threads of said gland nut with the mating threads of said body member;

(f) said third surface of said sealing ring making sealing contact with the conduit in response to the engagement of the threads of said gland nut with the mating threads of said body member; and wherein (g) the forces applied to said first and second surfaces by the contacting part of said ferrule and said shoulder, respectively, include components for urging the ends of said discontinuous sealing ring into sealing contact.

2. The combination as set forth in claim 1, wherein said sealing ring is fabricated of polymeric material and, which, in its closed state, has an inner circumference which is no greater than the outer circumference of the conduit to which the fitting is to be coupled and which, in its closed state, has an outer circumference which is no greater than the inner circumference of the threads of said gland nut.

3. The combination as set forth in claim 2, wherein the ends of said discontinuous sealing ring include congruent portions.

4. The combination as set forth in claim 3, wherein said ends include a dominant portion which is other than perpendicular to an imaginary internal axis of said ring.

5. The combination as set forth in claim 4, wherein said ends include a dominant portion in a plane which is other than perpendicular to the plane including the imaginary internal axis of said ring.

6. The combination as set forth in claim 5, wherein at least one of said ends includes a minor portion in a plane other than the plane of said dominant portion.

7. The combination as set forth in claim 2 and wherein said sealing ring, in its relaxed state, has an outer circumference which exceeds the circumference of the interior of said gland nut whereby said ring, when placed within said gland nut, is retained therein.

8. The combination as set forth in claim 7, wherein said sealing ring includes at least one wing on the outer circumference of said sealing ring for engaging the internal threads of said gland nut to provide further retention means.

9. The combination as set forth in claim 1, wherein at least a portion of a cross section of said sealing ring resembles a squared off "D" with said first, second, and third sealing surfaces comprising the lower most surface, the upper most surface and the left most surfaces, respectively of the squared off "D".

10. The combination as set forth in claim 9, wherein the contact between said shoulder and said second surface produces a force vector having first and second vector components parallel to, and at right angles to, the longitudinal axis of said fitting, respectively.

11. The combination as set forth in claim 10, wherein said first vector component has a greater magnitude than said second vector component.

12. The combination as set forth in claim 11, wherein said second vector component is effective to bring the ends of said sealing ring into sealing relationship and for bringing said third surface into intimate contact with the conduit.

13. The combination as set forth in claim 12 and wherein said sealing ring includes a first flange member constituting a downward continuation of said third surface for making an auxiliary seal between the conduit and said flared portion of said ferrule.

14. The combination as set forth in claim 13 and wherein said sealing ring includes a second flange member constituting an upward continuation of said third surface for providing a symmetrical sealing ring whereby it cannot be assembled improperly.

15. The combination as set forth in claim 1, wherein said third surface of said sealing ring includes at least one projection therefrom.

16. The combination as set forth in claim 15, wherein said projection co-acts with the conduit to deform the conduit and/or said projection when said ends of said sealing ring are in sealing contact.

17. The combination as set forth in claim 16, wherein said projection constitutes a fourth surface substantially parallel to, but displaced from, said third surface.

18. The combination as set forth in claim 17, wherein said fourth surface extends from said first end to said second end.

19. The combination as set forth in claim 1, wherein said flared portion of said ferrule comprises a section which is circular when cut by any plane normal to the longitudinal axis of the fitting.

20. The combination as set forth in claim 19, wherein said flared portion of said ferrule comprises a portion of a first right circular conic surface.

21. The combination as set forth in claim 20, wherein the portion of said body member which makes sealing line contact with said ferrule lip comprises an edge on the end of said body member.

22. The combination as set forth in claim 21, wherein said edge is formed by the junction between first and second body member surfaces.

23. The combination as set forth in claim 22, wherein one of said first and second body member surfaces comprises one of a right circular cylinder, a plane and a right circular conic surface.

24. The combination as set forth in claim 21, wherein said body member includes an interior right circular cylindrical surface having a diameter larger than said cylindrical wall of said ferrule.

25. The combination as set forth in claim 21, wherein said ferrule includes an inner cylindrical wall for mating with the interior surface of the conduit.

26. The combination as set forth in claim 25, wherein said inner cylindrical wall of said ferrule has threads for mating with an internal groove of the conduit.

27. The combination as set forth in claim 26, wherein said ferrule and said body member comprise electric conductors whereby there is electrical continuity from the body member to the interior surface of the conduit.

* * * * *